(12) United States Patent
Koch et al.

(10) Patent No.: US 9,640,000 B2
(45) Date of Patent: May 2, 2017

(54) SKY MARSHAL VIDEO ACCESS

(71) Applicant: AIRBUS OPERATIONS GMBH, Hamburg (DE)

(72) Inventors: Maik Koch, Hamburg (DE); Albin Poth, Hamburg (DE); Stefan Bode, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 677 days.

(21) Appl. No.: 13/689,391

(22) Filed: Nov. 29, 2012

(65) Prior Publication Data

US 2013/0160061 A1    Jun. 20, 2013

Related U.S. Application Data

(60) Provisional application No. 61/565,533, filed on Dec. 1, 2011.

(30) Foreign Application Priority Data

Dec. 1, 2011    (DE) .................... 10 2011 119 928

(51) Int. Cl.
| | |
|---|---|
| H04N 7/18 | (2006.01) |
| H04H 60/33 | (2008.01) |
| H04H 60/56 | (2008.01) |
| G07C 5/08 | (2006.01) |
| G08B 13/196 | (2006.01) |
| G07C 9/00 | (2006.01) |

(52) U.S. Cl.
CPC ......... *G07C 5/0866* (2013.01); *G08B 13/196* (2013.01); *G08B 13/1965* (2013.01); *G08B 13/19645* (2013.01); *G07C 9/00031* (2013.01); *G07C 9/00126* (2013.01); *H04N 7/18* (2013.01)

(58) Field of Classification Search
None
See application file for complete search history.

(56) References Cited

U.S. PATENT DOCUMENTS

| | | | | |
|---|---|---|---|---|
| 4,831,438 A | * | 5/1989 | Bellman, Jr. | .... G08B 13/19634 348/148 |
| 5,742,336 A | * | 4/1998 | Lee | ........................ B64D 47/00 348/143 |
| 6,744,381 B1 | * | 6/2004 | Collins | .............. B64D 45/0015 340/5.64 |
| 6,831,680 B1 | * | 12/2004 | Kumler | .............. B64D 45/0015 348/148 |

(Continued)

*Primary Examiner* — Jonathan V Lewis
(74) *Attorney, Agent, or Firm* — Dickinson Wright PLLC (57) ABSTRACT

A surveillance device and method provide access to a surveillance system for keeping a cabin of an aircraft under surveillance. A computer program may be used to execute the method for accessing the surveillance system. The surveillance device includes an authentication unit for examining an access-authorization request for access to the surveillance system, and a control unit for selecting, on the basis of the access-authorization request, a display unit from a plurality of display units provided in the aircraft, and for relaying a video-image signal corresponding to a captured video image of a subarea of the cabin of the aircraft to the selected display unit for the purpose of displaying the video image.

14 Claims, 10 Drawing Sheets

(56) References Cited

U.S. PATENT DOCUMENTS

| | | | | |
|---|---|---|---|---|
| 6,864,805 B1* | 3/2005 | Gomez | B64D 45/0015 | 340/945 |
| 6,877,694 B2* | 4/2005 | Gonzalez | B64C 1/1469 | 244/117 R |
| 7,495,687 B2* | 2/2009 | DuMas | G08B 13/19645 | 348/143 |
| 7,698,025 B1* | 4/2010 | Cornell | G01C 23/00 | 244/75.1 |
| 7,792,189 B2* | 9/2010 | Finizio | B64D 45/0015 | 348/148 |
| 8,127,333 B2* | 2/2012 | Weidel | B64D 45/0015 | 701/32.7 |
| 8,612,639 B1* | 12/2013 | Righi | G06F 11/143 | 710/15 |
| 2002/0147982 A1* | 10/2002 | Naidoo | G08B 13/19645 | 725/105 |
| 2003/0071743 A1* | 4/2003 | Seah et al. | | 340/945 |
| 2003/0117494 A1* | 6/2003 | Poblete | B64D 45/0015 | 348/148 |
| 2003/0130771 A1* | 7/2003 | Crank | | 701/4 |
| 2003/0192052 A1* | 10/2003 | Frisco et al. | | 725/76 |
| 2003/0200546 A1* | 10/2003 | Keen et al. | | 725/76 |
| 2004/0008253 A1 | 1/2004 | Monroe | | |
| 2004/0028391 A1* | 2/2004 | Black | G08B 13/19656 | 386/223 |
| 2004/0162067 A1 | 8/2004 | Stefani | | |
| 2004/0257246 A1 | 12/2004 | Pahl | | |
| 2006/0245620 A1* | 11/2006 | Roques | B64D 45/0015 | 382/115 |
| 2006/0276942 A1 | 12/2006 | Anderson | | |
| 2008/0024603 A1* | 1/2008 | Tsubota | H04N 7/18 | 348/143 |
| 2008/0266166 A1* | 10/2008 | Schuchman | G07C 5/008 | 342/37 |
| 2009/0072988 A1* | 3/2009 | Haywood | | 340/686.6 |
| 2010/0005495 A1* | 1/2010 | Stavaeus | B64C 1/1484 | 725/76 |
| 2010/0195634 A1 | 8/2010 | Thompson | | |
| 2011/0087559 A1* | 4/2011 | Paul | G06Q 30/0635 | 705/26.81 |

* cited by examiner

FIG 2a

Privacy door closed

FIG 2b

Privacy door closed

SKY MARSHAL VIDEO ACCESS

The present invention relates to a surveillance device for access to a surveillance system for keeping a cabin of an aircraft under surveillance, to such a surveillance system for keeping a cabin of an aircraft under surveillance, to an associated method for access to a surveillance system for keeping a cabin of an aircraft under surveillance, and also to a computer program for executing the method.

Specially trained flight-security escorts (sky marshals) are increasingly being deployed on board aircraft. These sky marshals are non-uniformed, specially trained persons who escort passenger flights and further enhance the security of the passengers, crew and aircraft. A sky marshal often occupies a seat on board the aircraft from where he/she can observe subareas on board the aircraft that are relevant to security, such as the bombardment-proof and intrusion-proof cockpit door of the aircraft. On board many aircraft a second cockpit door (also designated as a privacy door or secondary barrier), which is located closer to the cabin, proceeding from the first cockpit door, is now being employed with increasing frequency. By virtue of the second cockpit door (privacy door), on the one hand a second barrier to the cockpit is created. Furthermore, the second cockpit door may also constitute a visibility screen, in order to create a private area for the cockpit crew on board the aircraft (inclusive of private kitchen and toilet at the disposal of the cockpit crew only).

It is an object of the present invention to provide a surveillance device and also a method for access to a surveillance system for keeping a cabin of an aircraft under surveillance, such a surveillance system with a surveillance device of such a type, and a computer program for executing the method, by means of which a reliable and inconspicuous surveillance of at least one subarea of the cabin of the aircraft is guaranteed.

This object is achieved by virtue of a surveillance device according to Claim 1, a surveillance system according to Claim 5, a method according to Claim 10, and also a computer program according to Claim 14. Particular embodiments arise in each instance out of the dependent claims.

The surveillance device according to the invention for access to a surveillance system for keeping a cabin of an aircraft under surveillance comprises an authentication unit and a control unit. The authentication unit is configured to examine an access-authorisation request for access to the surveillance system. The control unit is configured to designate, on the basis of the access-authorisation request, a display unit from a plurality of display units provided in the aircraft, and to relay a video-image signal corresponding to a captured video image of a subarea of the cabin of the aircraft to the designated display unit for the purpose of displaying the video image.

In particular, the surveillance device is configured to control access to a surveillance system provided in the aircraft with the aid of the control unit and on the basis of the access-authorisation request, for example to grant it or to refuse it. The surveillance system is provided in the aircraft for the purpose of keeping one or more subareas of the cabin of the aircraft under surveillance and capturing (recording) video images corresponding to the subareas. By means of the control unit, the surveillance device can, in particular, examine whether access to the surveillance system is granted and, if access is granted, select a display unit on which the video image(s) provided by the surveillance system is/are to be displayed.

The authentication unit and the control unit may be provided or realised in a common unit such as, for example, a common processing unit, a common server or a common processor. The authentication unit and the control unit may, however, also be provided in units that are separate from one another but connected to one another.

Furthermore, it is possible to arrange the authentication unit and/or the control unit in centralised or decentralised manner. It is, for example, conceivable that the access-authorisation request is recorded in decentralised manner (for example, by a plurality of components responsible for the recording of the access-authorisation request) and is relayed for examination to the centrally arranged authentication unit (which, in turn, can relay its information based on the evaluation to the central control unit). However, it is also possible that a plurality of authentication units are present, each of which has been connected to a component responsible for the recording of the access-authorisation request.

In the case of several authentication units, it is conceivable that only the authentication unit that has been assigned to the component responsible for the recording of the access-authorisation request, which actually records the access-authorisation request, receives the access-authorisation request. In this case of several authentication units arranged in decentralised manner, several control units may be arranged in decentralised manner in the same way, but a central control unit may also be present which in each instance can then receive the evaluations from the corresponding authentication units.

Irrespective of whether the authentication unit is formed in centralised or decentralised manner, the authentication unit is preferentially capable of being connected to a plurality of components (a plurality of authentication appliances) responsible for the recording of the access-authorisation request. The one or more of these authentication appliances on which an access-authorisation request was actually effected (e.g. entered) relay(s) the access-authorisation request to the authentication unit. If, for example, a central authentication unit is provided and an access-authorisation request was entered into one of the plurality of authentication appliances, the authentication unit receives the access-authorisation request from the authentication appliance that has accepted the access-authorisation request. If, on the other hand, for example, several centralised authentication units are provided and an access-authorisation request was entered into one authentication appliance, only the authentication unit that is responsible for this authentication appliance (that is assigned to this authentication appliance) receives the access-authorisation request.

Irrespective of whether the control unit is formed in centralised or decentralised manner, it is configured to designate or select one or more display units from the plurality of display units provided in the aircraft, on which the recorded video image is to be (re)presented. In particular, the control unit may be configured to designate or select the display unit to which the access-authorisation request can be assigned (on which, for example, the access-authorisation request was made) if the authentication unit grants access by taking the access-authorisation request into account. It is, for example, conceivable that one of the plurality of display units is assigned to each authentication appliance for recording the access-authorisation request (irrespective of the precise configuration of the authentication appliance). The control unit may in this case be configured to select from the plurality of display units that display unit on the associated authentication appliance of which the access-authorisation request was entered.

The control unit may furthermore be configured to instruct the designated (selected) display unit to display the video image at a predetermined position on the selected display unit such that the video image is superimposed on an in-flight entertainment programme represented on the display unit. The video image may, in particular, be variable in its size and its position on the display unit. The in-flight entertainment programme may be retrievable or implemented on each of the plurality of display units. The video image, on the other hand, is represented only on the display unit(s) that was/were designated or selected for display. The predetermined position of the video image may be permanently defined or variable. It is possible, for example, that an in-flight entertainment programme or a menu pertaining to the in-flight entertainment programme is displayed on the display unit (e.g. on a display or monitor), and the video image is superimposed on the menu of the entertainment programme or on the entertainment programme in reduced-size representation (e.g. is displayed in a corner of the display unit). By selecting the video image, for example with the aid of an external input device or, in the case of a touch-sensitive monitor, by direct selection of the video image, the latter can be represented in enlarged representation, for example on a larger display area or on the entire display area of the display unit.

In this way, the designated (selected) display unit of the access-authorised person, such as a sky marshal, can display the video image provided by the surveillance system. By this means, the access-authorised person, such as the sky marshal, can keep the monitored subarea of the cabin of the aircraft under surveillance directly with the aid of the display unit, and does not require a clear view of this subarea.

According to a first possible realisation, the control unit may further be configured to instruct the display unit selected for displaying the video image furthermore to display a warning element, for example a selectable warning element, which, for example, is integrated into the conventional in-flight entertainment programme. Upon selection of the warning element by the access-authorised user, such as the sky marshal, the control unit can cause a warning appliance, such as a so-called flight warning system (FWS), to transmit a warning signal, in particular an acoustic and/or visual warning signal, into the cockpit of the aircraft.

According to a second possible realisation, which can be used independently of or in combination with the first possible realisation, the control unit may be configured to unlock a telephone assigned to the designated (selected) display unit, such as a telephone integrated into the seat (from which the selected display unit is conventionally viewable), for connection to the cockpit of the aircraft. It is, for example, conceivable that the telephones provided in the aircraft, such as those integrated into the seats of the aircraft, have been disabled for a connection into the cockpit, but rather, for example, only external calls can be made so long as no authentication has taken place. It is accordingly possible that, for example, upon the selection of a display unit from the plurality of display units on the basis of the access-authorisation request the telephone associated with the selected display unit is also released for the cockpit connection. Alternatively, it is also possible to release the connection into the cockpit only when access has been granted and the connection into the cockpit is requested by the access-authorised person.

The surveillance system according to the invention for keeping a cabin of an aircraft under surveillance is provided on board the aircraft and comprises the surveillance device as is/was described herein and a camera unit. The camera unit comprises at least one, in particular two or more, for example three, video cameras. In the case of two or more, for example three, video cameras, the video cameras are configured and are arranged and oriented in such a manner in the aircraft to capture, in each instance, a video image of differing subareas of the cabin of the aircraft and, in each instance, to generate an associated video-image signal. In this way, a first subarea can be monitored by a first video camera, a second subarea by a second video camera, and a third subarea of the cabin of the aircraft by a third video camera. The subareas monitored by these three video cameras are different in each instance but may overlap.

One of the at least one, in particular the two or more, for example three, video cameras may be provided on or above a cockpit door arranged between the cockpit and the cabin, in particular on or above a bombardment-proof and intrusion-proof cockpit door. The video camera may be configured and may be oriented in such a manner in the direction of the cabin to capture a video image of a subarea outside the cockpit door, in particular an area in front of the bombardment-proof and intrusion-proof cockpit door, and to generate an associated video-image signal.

The video images captured by the camera unit, or a subset of the video images, more precisely the associated video-image signals, may then be relayed from the control unit to the display unit selected on the basis of the access-authorisation request, in order to be displayed on the display unit.

The surveillance system may furthermore comprise a plurality of authentication appliances for recording the access-authorisation request. Each of the plurality of authentication appliances may be assigned to a display unit of the plurality of display units, so that, for example, an authentication appliance by which the access-authorisation request can be recorded is assigned to each display unit. The control unit may in this case be configured to designate that display unit for displaying the video image, on the associated (assigned) authentication appliance of which the access-authorisation request that identifies a user as access-authorised was recorded (made).

For the authentication appliances, various configurations are conceivable which may also be combined with one another. Accordingly, it is possible that such an authentication appliance comprises a code-input unit, in particular a telephone or a touch-screen, for entering a predetermined code, and/or a card-reading unit for evaluating an identification card (e.g. for read-out of a chip or magnetic strip of the identification card), and/or a reading unit for identifying electromagnetic waves emitted by a transponder. The reading unit may be, for example, an RFID reading unit (RFID: radio-frequency identification) which can read out, in wireless manner, a corresponding RFID chip on which the data entitling to access are stored. The RFID reading unit may, in particular, be integrated invisibly into the seat or into units of the in-flight entertainment (IFE) system, such as, for example, monitors of the IFE system. Furthermore, it is possible, instead of or in addition to the aforementioned units, to provide a unit for examining biometric data, such as a unit for electronic examination of a fingerprint or for scanning an eye.

In particular, the camera unit may be a part of a cockpit-door surveillance system (CDSS) provided on board the aircraft. Additionally or as an alternative, the display units may be a part of the IFE system. The CDSS and the IFE system may, for example, be connected to one another via a bus connection, so that the video images recorded by the CDSS can be fed into the IFE system and are capable of being represented on the display units of the IFE system.

The method according to the invention for access to a surveillance system for keeping a cabin of an aircraft under surveillance comprises the following steps: examining, by means of an authentication unit, an access-authorisation request for access to the surveillance system; designating, by means of a control unit and on the basis of the access-authorisation request, a display unit from a plurality of display units provided in the aircraft; and relaying, by means of the control unit, a video-image signal corresponding to a captured video image of a subarea of the cabin of the aircraft to the designated display unit for the purpose of displaying the video image.

For example, on the basis of an access-authorisation request entered by a person who desires access to the surveillance system (such as a sky marshal) it can firstly be examined whether the person is authorised for access. If on the basis of the access-authorisation request it is ascertained that access is granted, it can be determined on which display unit the video image captured by the surveillance system is to be represented. The display unit may be, in particular, that display unit, on the assigned authentication appliance of which the access-authorisation request was recorded.

On the designated (selected) display unit a warning element may furthermore be displayed which, for example, can be selected directly on the display unit (by touching the display unit) or by an external input unit. Upon selection of the warning element, a warning signal, in particular an acoustic and/or visual warning signal, can be transmitted into the cockpit of the aircraft. Additionally or as an alternative, on the designated (selected) display unit a telephone assigned to this display unit for connecting to the cockpit of the aircraft may furthermore be enabled, so that the cockpit can be warned. It is also conceivable that the access-authorised person can select on the selected display unit which, and how many, of the video images captured by the video cameras of the surveillance system are to be displayed.

The video image may, for example, be variable in its size and may be displayed at a predetermined position on the display unit, in which connection this position may also be variable. The video image may, in particular, be displayed in such a manner on the designated display unit that it has been superimposed on an in-flight entertainment programme represented on the display unit, which is retrievable on each of the plurality of display units.

Moreover, the invention relates to a computer program with program-code means, which, when it has been loaded into a computer or into a processor (for example, a microprocessor, microcontroller or digital signal processor (DSP)) or is running on a computer or processor (e.g. a microprocessor, microcontroller or DSP), causes the computer or processor (e.g. microprocessor, microcontroller or DSP) to execute the method previously described. In addition, the invention relates to a program-storage medium or computer-program product with the stated computer program.

Even if some of the aspects described above were described with reference to the surveillance device or the surveillance system, these aspects may also be implemented as a method or as a computer program executing the method. Likewise, aspects described with reference to the method may be realised by suitable units in the surveillance device or in the surveillance system or may be executed by the computer program.

Preferred embodiments of the present invention will be elucidated below with the aid of the appended schematic Figures. Represented are:

FIG. 3b a schematic representation of the angle of view of the video camera from FIG. 3a;

In the following, without being limited thereto, specific details will be presented, in order to provide a complete understanding of the present invention. To a person skilled in the art it is clear, however, that the present invention can be used in other embodiments which may deviate from the details presented below.

To a person skilled in the art it is clear that the explanations presented below may have been implemented or may be implemented using hardware circuits, software means or a combination thereof. The software means may be connected to programmed microprocessors or to a general computer, to an ASIC (application-specific integrated circuit) and/or to DSPs (digital signal processors). In addition, it is clear that even when the following details are described with reference to a method these may also be realised in a suitable appliance unit, in a computer processor and in a memory connected to a processor, the memory being provided with one or more programs that carry out the method when they are executed by the processor.

Figure 1:
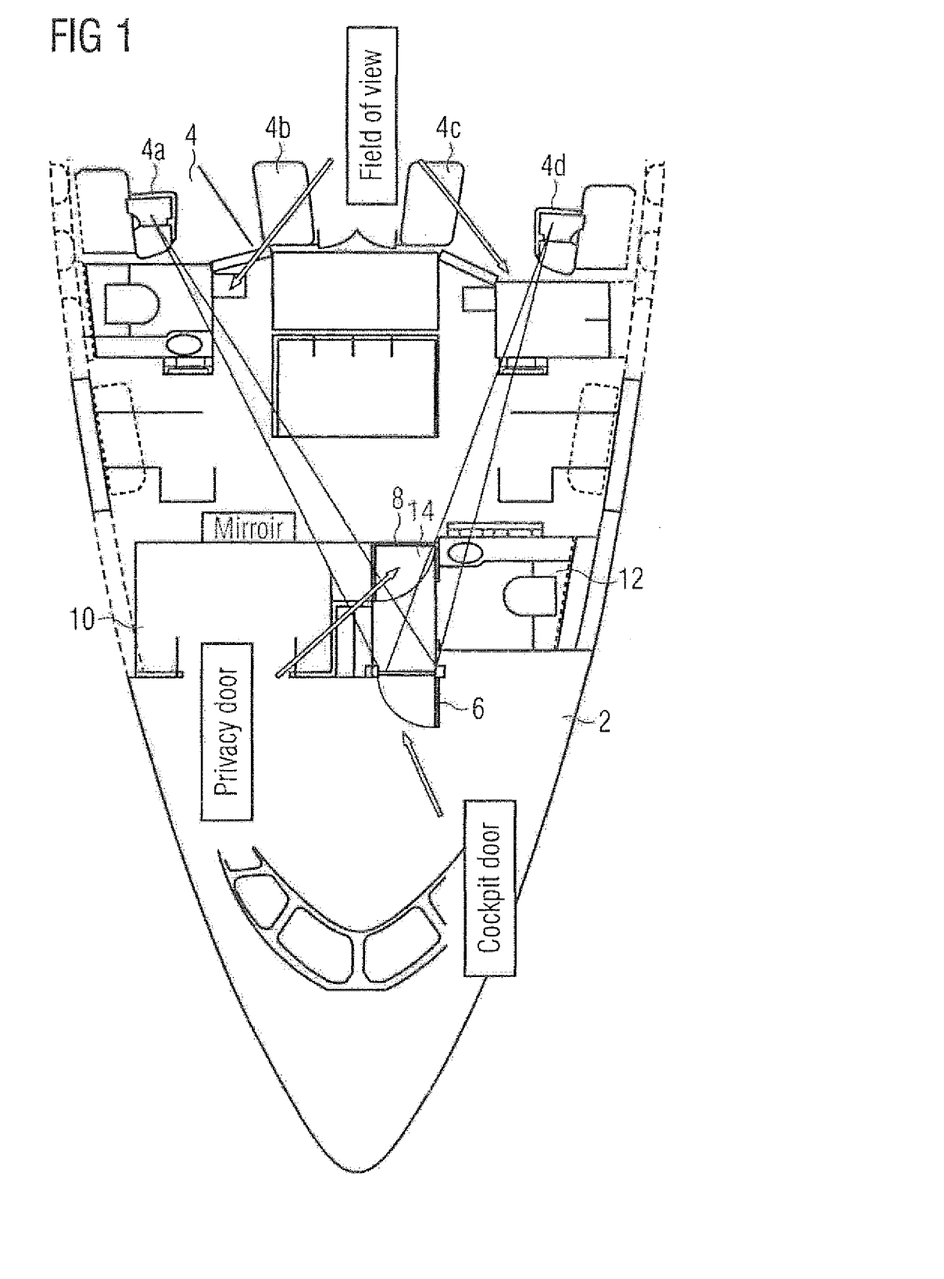
FIG. 1 a schematic representation of a cockpit and of a part of the cabin of an aircraft.

FIG. 1 shows a schematic representation of a section of an aircraft, more precisely the anterior part (nose) of an aircraft. In this section a cockpit 2 and also the anterior cabin area 4 of the aircraft are represented. As can be discerned in FIG. 1, the cockpit 2 is separated from the cabin area 4 by a bombardment-proof and intrusion-proof cockpit door 6.

An air marshal may, for example, be seated on the front seats 4a, 4b, 4c, 4d of the aircraft. The air marshal has a particularly good field of view (angle of view) onto the cockpit door 6 from seats 4a, 4d on the periphery of the aircraft. As can furthermore be discerned in FIG. 1, a second cockpit door (designated hereinafter as privacy door 8) is arranged between the cockpit 2 and the cabin area 4. The privacy door 8 is located in the longitudinal direction of the aircraft (direction of flight), further away from the cockpit 2 than the cockpit door 6. The privacy door 8 creates a private space (private area) for the cockpit staff (together with private kitchen 10 and toilet 12), which is separated off from the cabin area 4. If the privacy door 8 is closed and of opaque design, observation of the cockpit door 6 by the air marshal is no longer possible, even from seats 4*a*, 4*d*. In the case of a privacy door 8 with a grille, for example, the view is at least restricted.

Figure 2A:
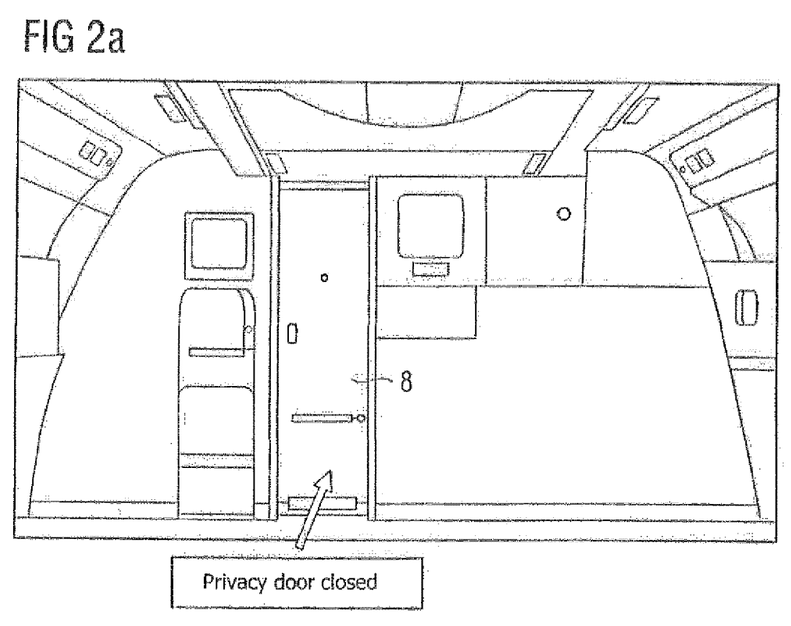
FIG. 2a a schematic representation of a closed privacy door for separating off a private area of the cockpit from FIG. 1.
Figure 2B:
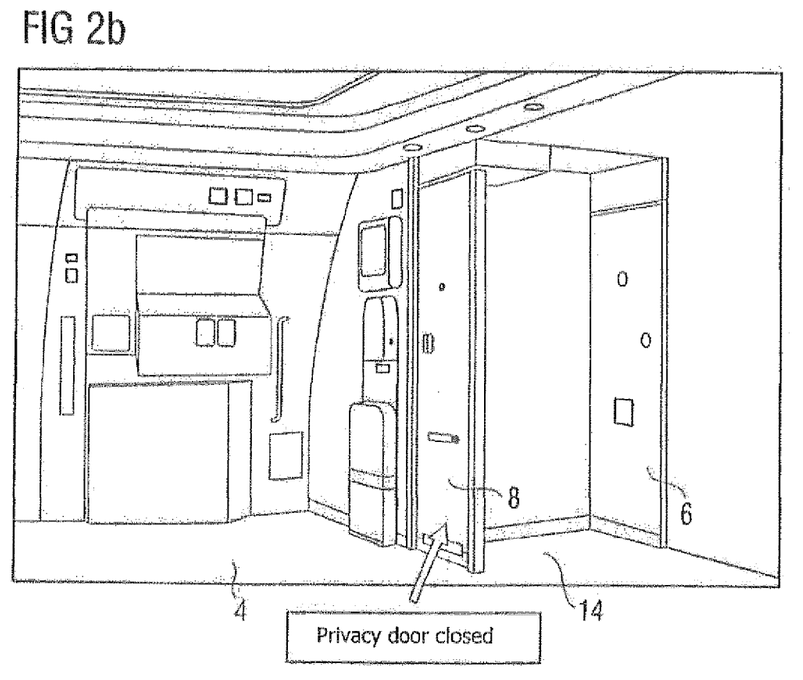
FIG. 2b a further schematic representation of a closed privacy door for separating off a private area of the cockpit from FIG. 1.

FIGS. 2*a* and 2*b* show a schematic view of the closed privacy door 8. In FIG. 2*b* it can be discerned how the privacy door 8 (in the direction of flight of the aircraft) is located closer to the cabin area 4 than the cockpit door 6. The cockpit door 6, the privacy door 8, the private toilet 12 and the private kitchen 10 form, in the arrangement shown in exemplary manner in FIGS. 1 and 2*b*, a passageway area 14 outside the cockpit door 6, which cannot be observed, or can be observed at least in impeded manner, by the air marshal when the privacy door 8 is closed. This is also illustrated in FIG. 2*a* for the case of an opaque privacy door 8. As shown therein, the closed privacy door 8 obscures the view of the cockpit door 6.

Figure 3A:
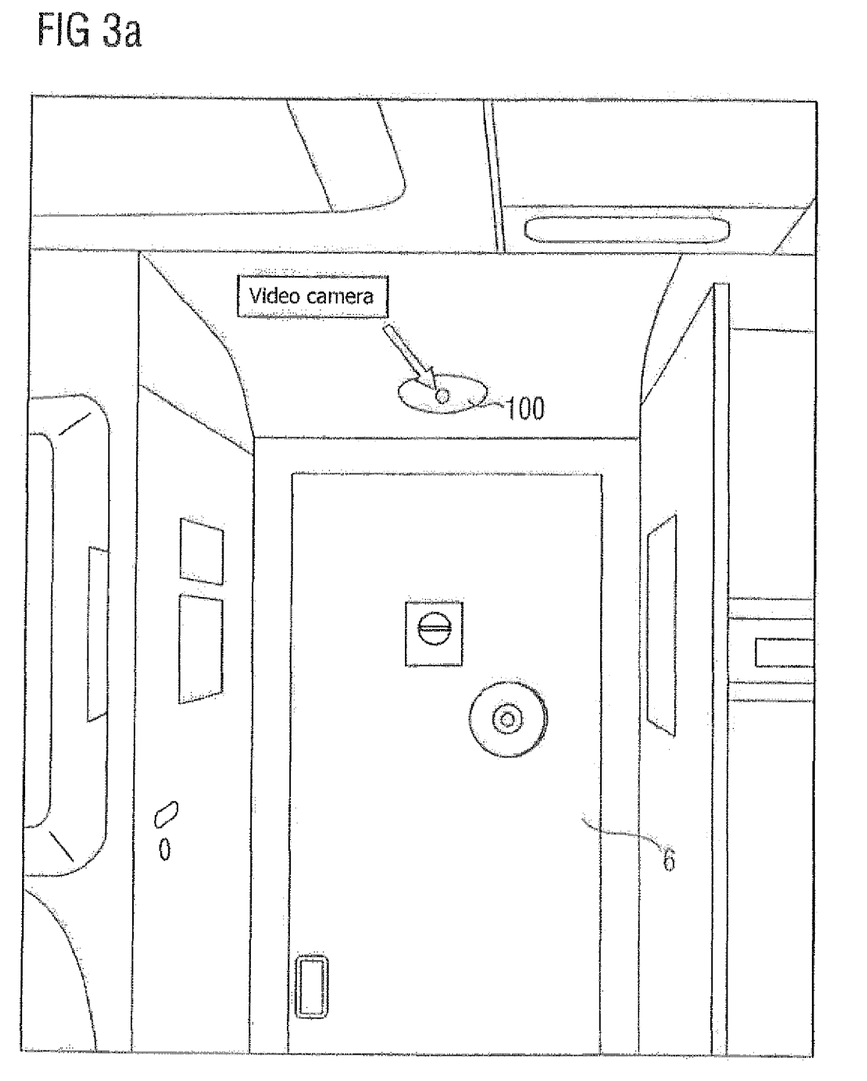
FIG. 3a a schematic representation of an arrangement of a video camera on a cockpit door of the cockpit from FIG. 1.
Figure 3B:
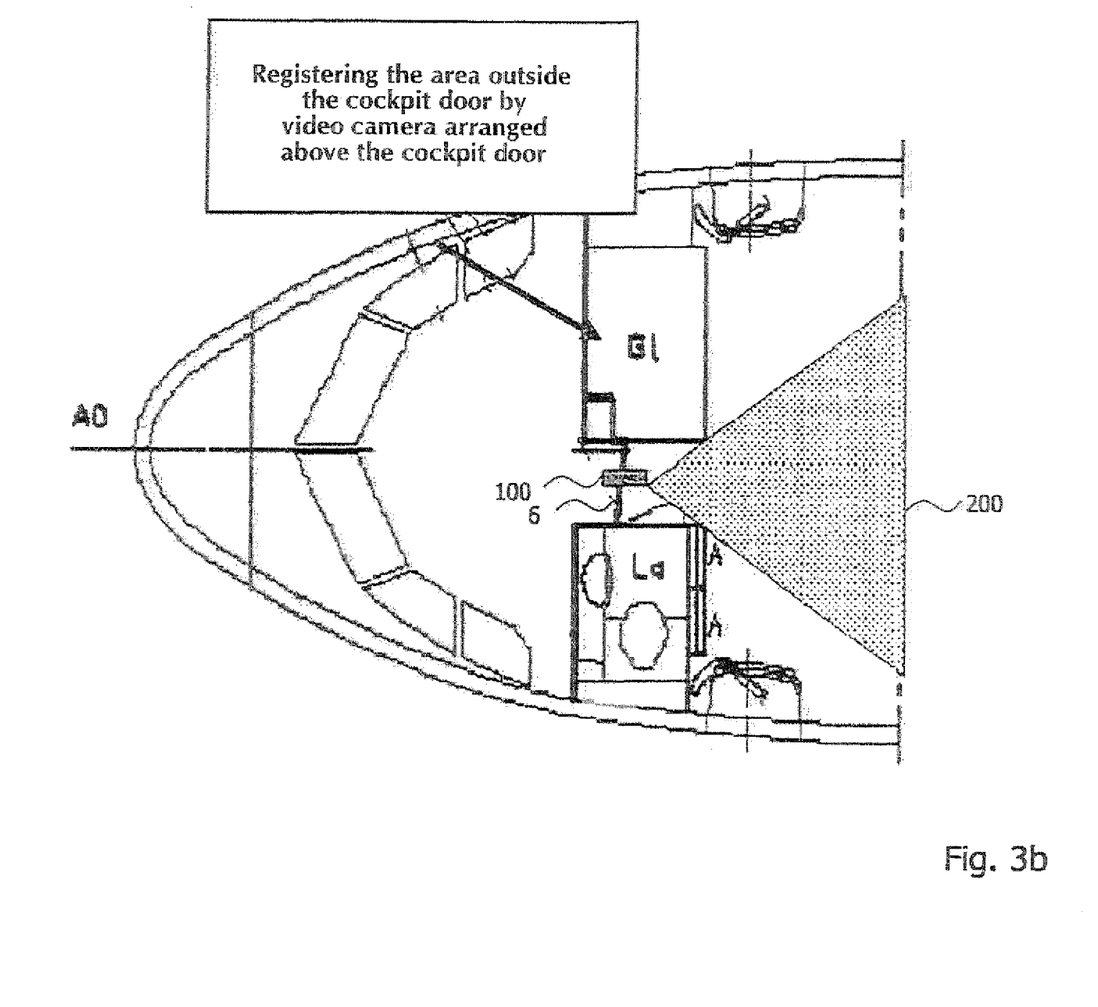

FIG. 3*a* shows a possible arrangement of a video camera 100 as part of a camera unit on the cockpit door 6. In this arrangement the video camera 100 is arranged above the side of the cockpit door 6 facing away from the cockpit 2. Alternatively, the video camera 100 may, for example, also be arranged on the cockpit door 6 itself or on the ceiling above the passageway area 14 (see FIG. 2*b*). Each of these arrangements guarantees a surveillance of the passageway area 14 with the aid of the video camera 100. The arrangement shown schematically in FIG. 3*a* guarantees a field of view 200 (angle of view), represented in FIG. 3*b*, of the video camera 100. As can be discerned in FIG. 3*b*, the video camera 100 arranged on or above the cockpit door 6 and oriented in the direction of the cabin 4 registers a subarea (and in particular the passageway area 14) of the cabin 4. The video image captured (recorded) by the video camera can then be relayed to a selected display unit. This is represented in exemplary manner in FIG. 4. How the selection of the display unit to which the video image is relayed for the purpose of display is effected will be described with reference to FIGS. 6 to 8.

Figure 4:
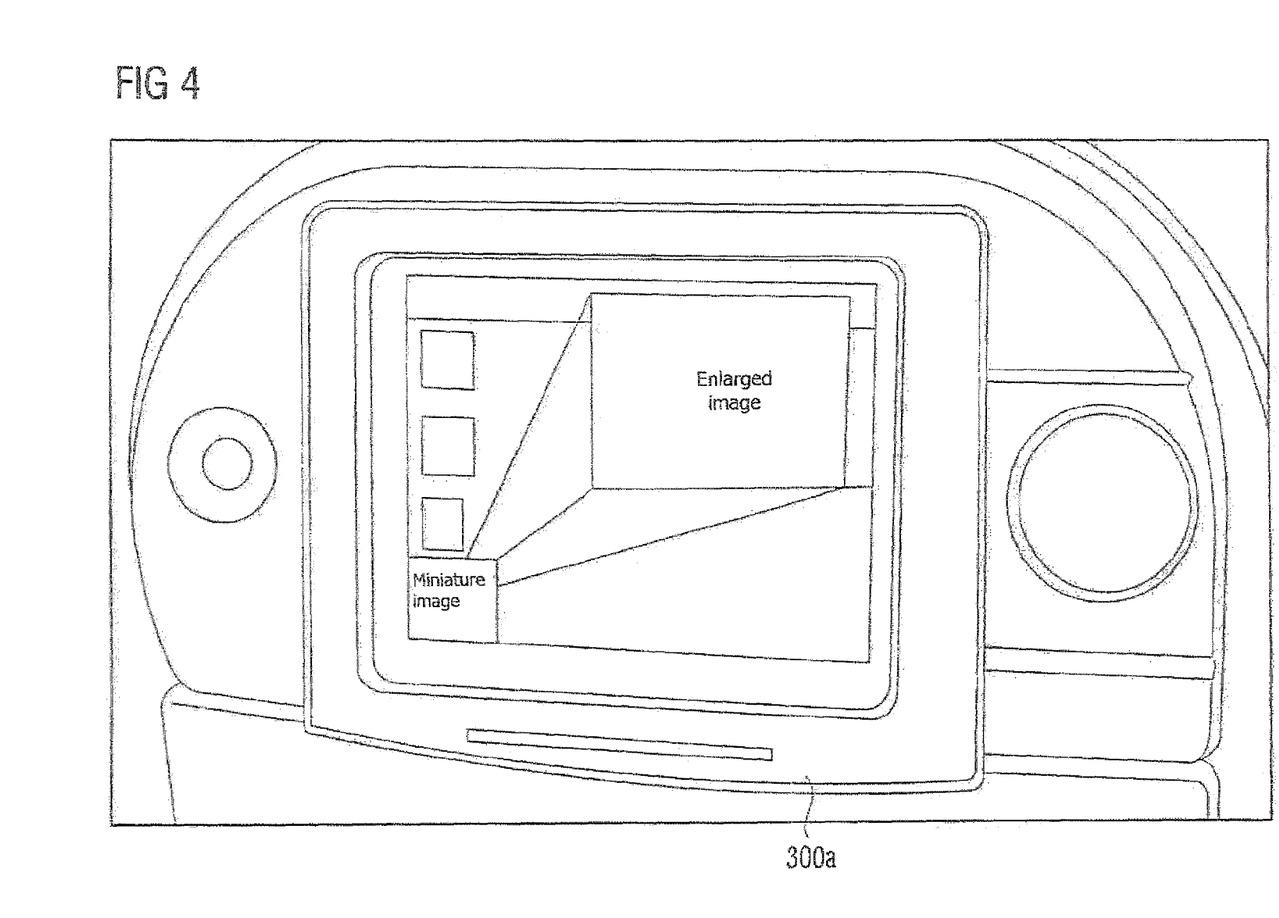
FIG. 4 a schematic representation of a video image captured by the video camera from FIG. 3a on a display unit of an aircraft.

FIG. 4 shows, by way of display unit, a monitor 300*a* integrated into a seat of the person in front as part of the in-flight entertainment (IFE) system. As can be discerned in FIG. 4, the video image captured by the video camera 100 is capable of being represented on the monitor 300*a* in various ways. In normal operation the display unit is instructed by a control unit 640 (see FIG. 6), described in still more detail in the following, to display the video image in reduced-size form, for example in the lower left corner of the monitor 300*a*. As a result, the air marshal is able to observe the video image of the video camera 100 inconspicuously. Even a possible person in the next seat will assume that the air marshal is viewing the normal in-flight entertainment programme. If something unusual in the reduced-size video image attracts the attention of the air marshal, he/she can enlarge the video image at any time, as also indicated schematically in FIG. 4. For this purpose he/she can, for example with the aid of an external control element, select and enlarge the reduced-size video image. It is also conceivable that the monitor 300*a* takes the form of a touch-sensitive monitor (touch-screen), and the air marshal can touch the reduced-size image with a view to enlargement.

Figure 5A:
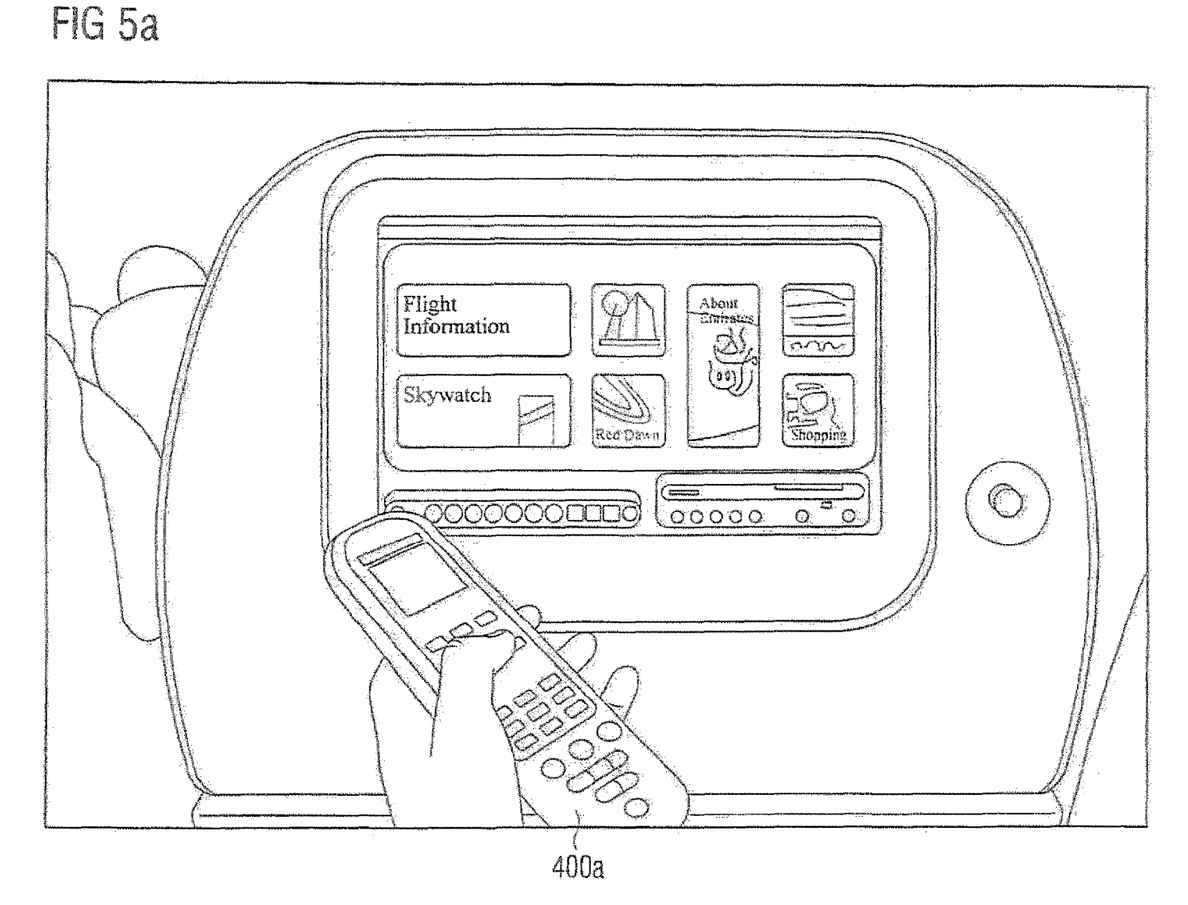
FIG. 5a a possible realisation of a code-input unit.
Figure 5B:
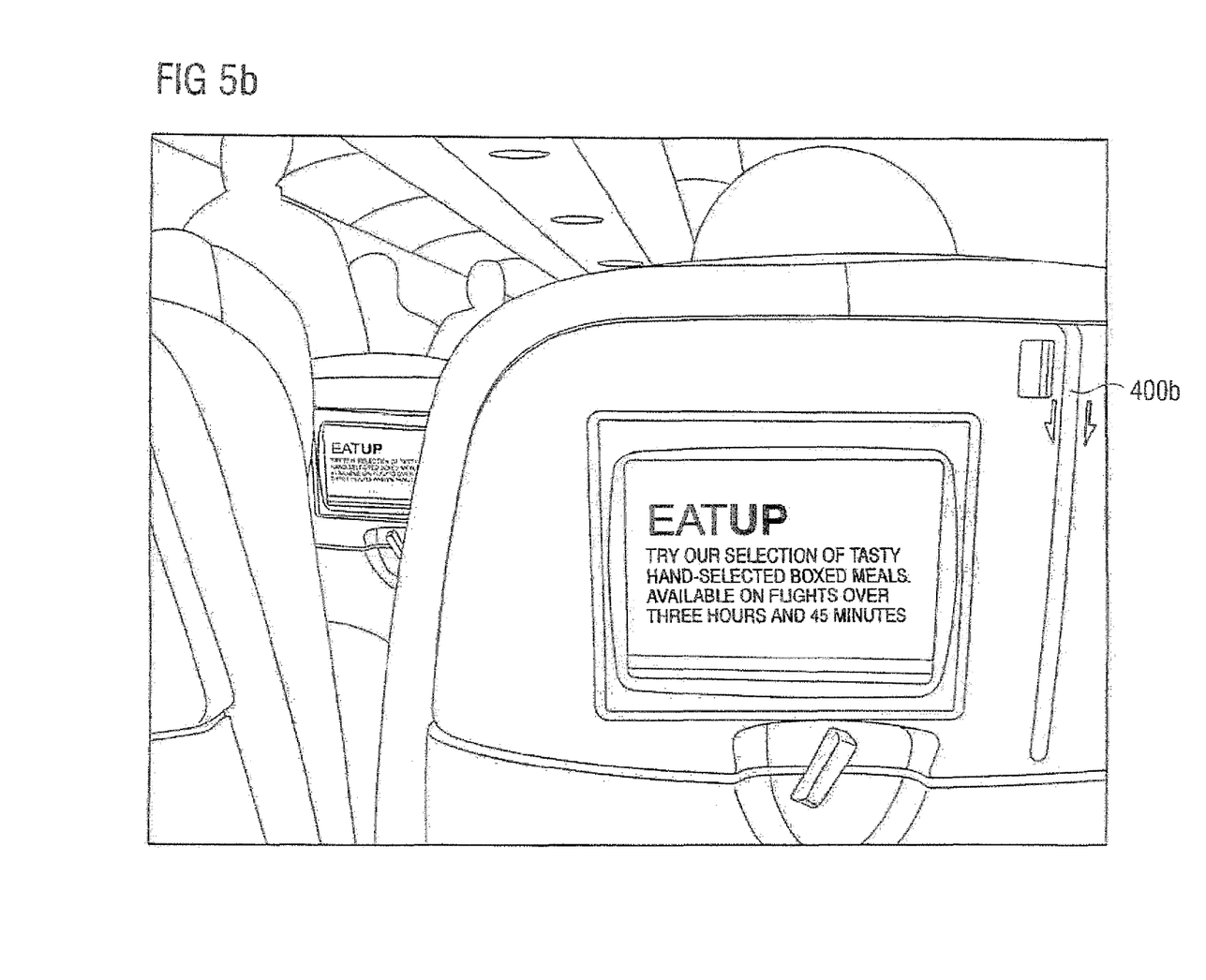
FIG. 5b another possible realisation of a code-input unit.

In order to ensure that only access-authorised persons, such as air marshals, are given access to the surveillance system and hence to the video image recorded by the video camera 100 (as part of the surveillance system), it is firstly examined whether the person desiring access is entitled to access. For this purpose, by means of an authentication appliance provided in each instance on a subset of the seats of the aircraft or on all the seats of the aircraft the access authorisation is queried, i.e. the person can enter his/her access-authorisation request into the authentication appliance. Two examples of such an authentication appliance are shown in FIGS. 5*a* and 5*b*, in which connection alternatives to the authentication appliances shown in exemplary manner in FIGS. 5*a* and 5*b* or additional authentication mechanisms are also conceivable. For example, additionally or alternatively, biometric authentication mechanisms are also conceivable.

According to FIG. 5*a*, the access-authorised person enters a code, in particular a multi-digit code, into a telephone 400*a* assigned to his/her seat, which in this example serves as authentication appliance. Since the code is known only to the access-authorised persons, only these persons are given access to the surveillance system. This means that the video image recorded by the video camera 100 is represented only on the monitor 300*a* assigned to the authentication appliance. In FIG. 5*b* a card-reader 400*b* serves as authentication appliance. The access-authorised person in this case guides an identification card through the card-reader 400*b* assigned to his/her seat. The card-reader 400*b* may be the ordinary telephone-card reader which conventionally is able to read out, for example, magnetic strips of credit cards for the purpose of paying for a telephone call. The card-reader shown in FIG. 5*b* may additionally read out the information of an identification card. As an alternative to a magnetic-strip card-reader shown in FIG. 5*b*, a chip-card reader may also be employed.

The access-authorisation request recorded by the authentication appliances shown in exemplary manner in FIGS. 5*a* and 5*b* is then relayed to an authentication unit 620 and evaluated by the latter, as will be described below with reference to FIGS. 6 to 8.

Figure 6:
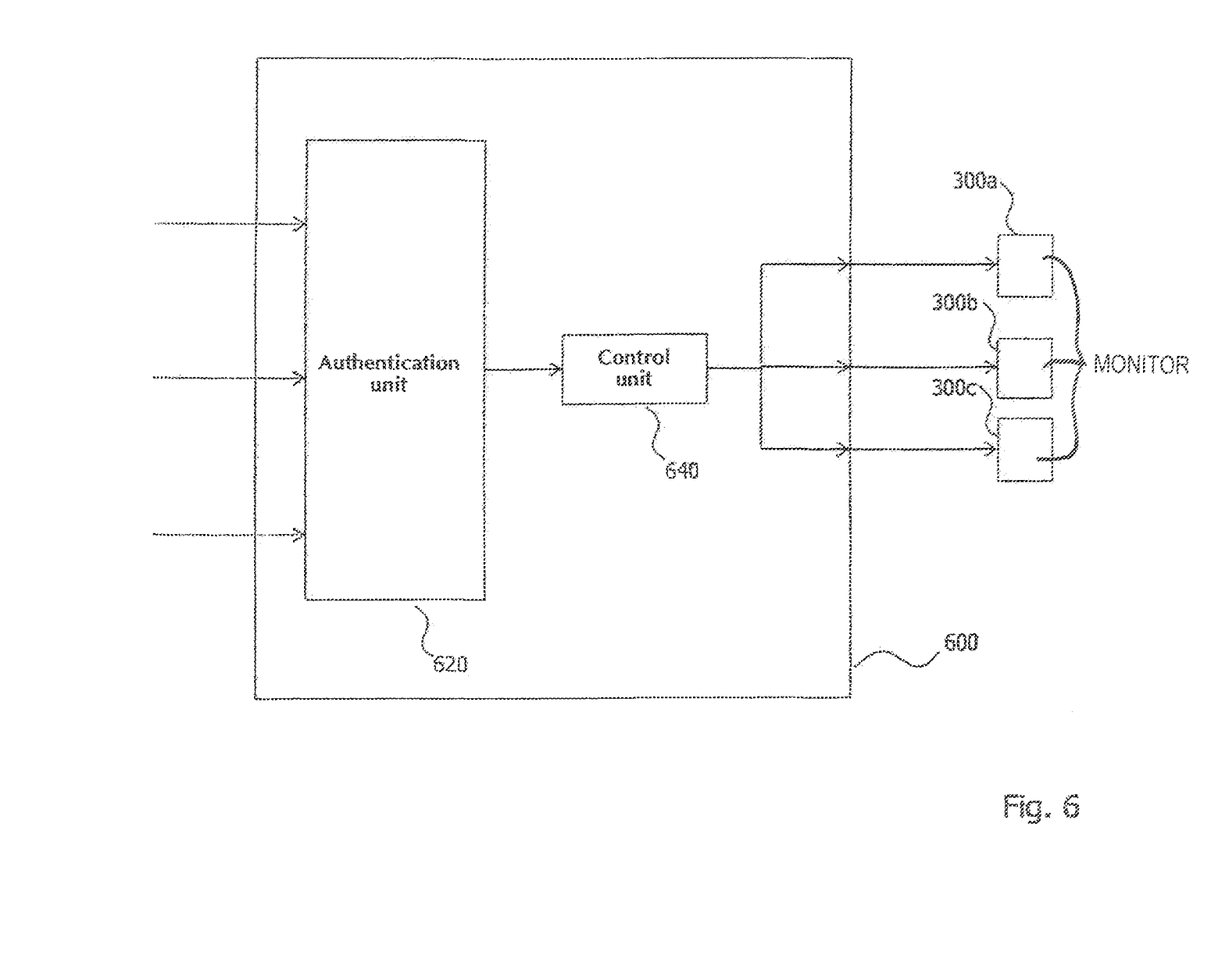
FIG. 6 a schematic representation of a surveillance device according to an embodiment of the present invention.

In FIG. 6 an embodiment of a surveillance unit 600 for controlling access to the surveillance system of the aircraft is represented schematically. The surveillance device 600 comprises an authentication unit 620 and a control unit 640, which are represented in FIG. 6 in exemplary manner as units that are separate from one another but connected to one another. The authentication unit 620 and the control unit 640 may, however, also be combined with one another in a common unit. The authentication unit 620 is connected to authentication appliances such as were shown in exemplary manner in FIGS. 5*a* and 5*b*. From these authentication appliances the authentication unit can in each instance receive access-authorisation requests, as represented schematically by the arrows leading into the authentication unit. Each of these arrows represents a connection to an authentication appliance or to a subset of authentication appliances. The three connections shown in FIG. 6 are, of course, to be understood only as being purely exemplary, and there may be any number of connections to any possible number of authentication appliances. Besides being connected to the authentication unit, the control unit 640 is connected in exemplary manner to three monitors 300*a*, 300*b*, 300*c* such as have been shown in exemplary manner in FIGS. 4, 5*a* and 5*b*. The control unit may, however, be connected to any possible number of monitors 300*a*, 300*b*, 300*c*, for example to each of the monitors 300*a*, 300*b*, 300*c* of the IFE system. The mode of operation of the surveillance device 600 from FIG. 6 will be elucidated in more detail below with reference to FIGS. 7 and 8.

Figure 7:
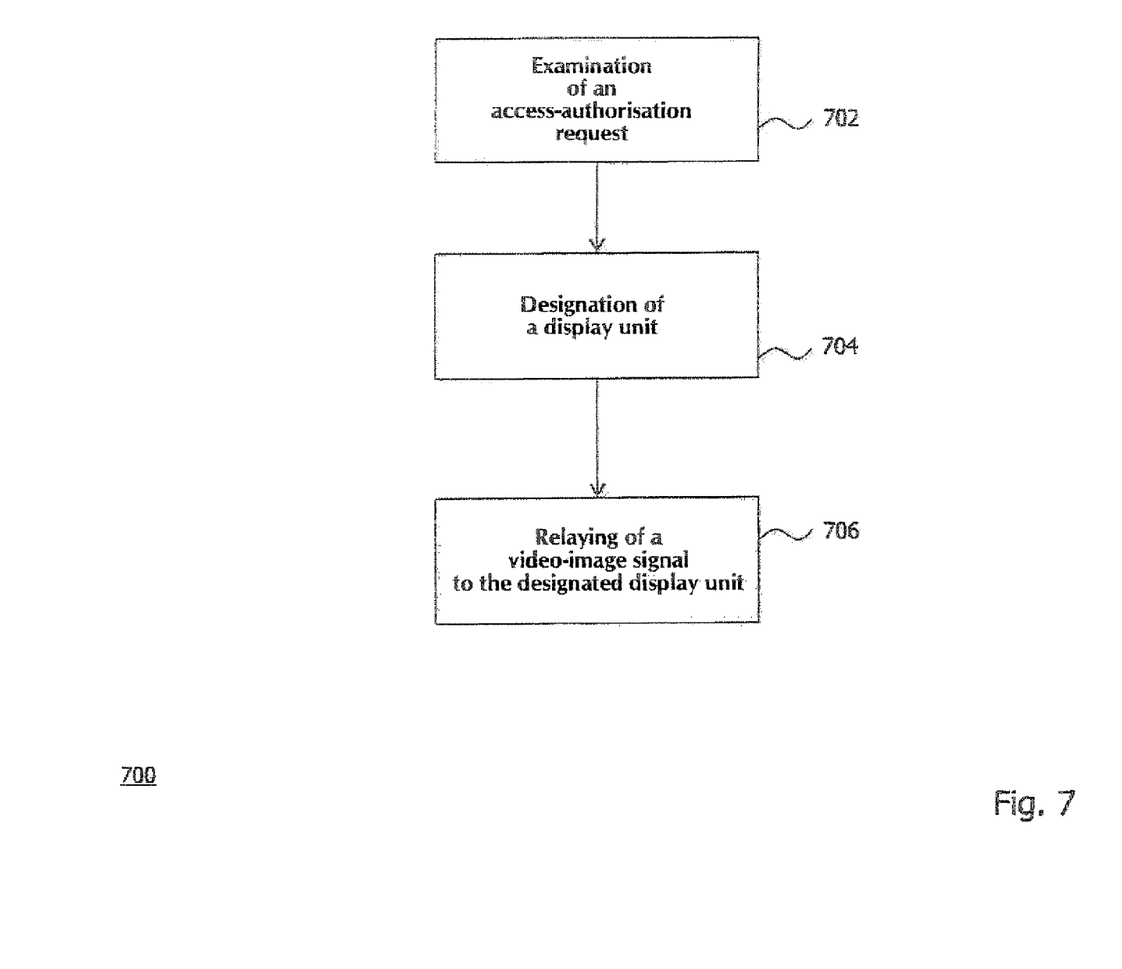
FIG. 7 a flow chart of a method executed in the surveillance device from FIG. 6 according to a first embodiment of the present invention.

FIG. 7 shows a flow chart of a method executed in the surveillance device 600 from FIG. 6 according to a first embodiment. In step 702 an access-authorisation request recorded (accepted), for example, by the authentication appliance shown in FIGS. 5a and 5b is examined in the authentication unit 620. If the authentication is successful, i.e. access to the surveillance system is granted, a monitor 300a is selected (step 704) on the basis of the access-authorisation request from a plurality of monitors 300a, 300b, 300c provided in the aircraft. For example, monitor 300a is selected, on the associated authentication appliance of which the access-authorisation request was made. Finally, in step 706 a video-image signal corresponding to the video image of the area 14 outside the cockpit door 6 registered by the video camera 100 is relayed to the selected display unit 300a for the purpose of displaying the video image and is displayed there correspondingly, as shown in exemplary manner in FIG. 4.

Figure 8:
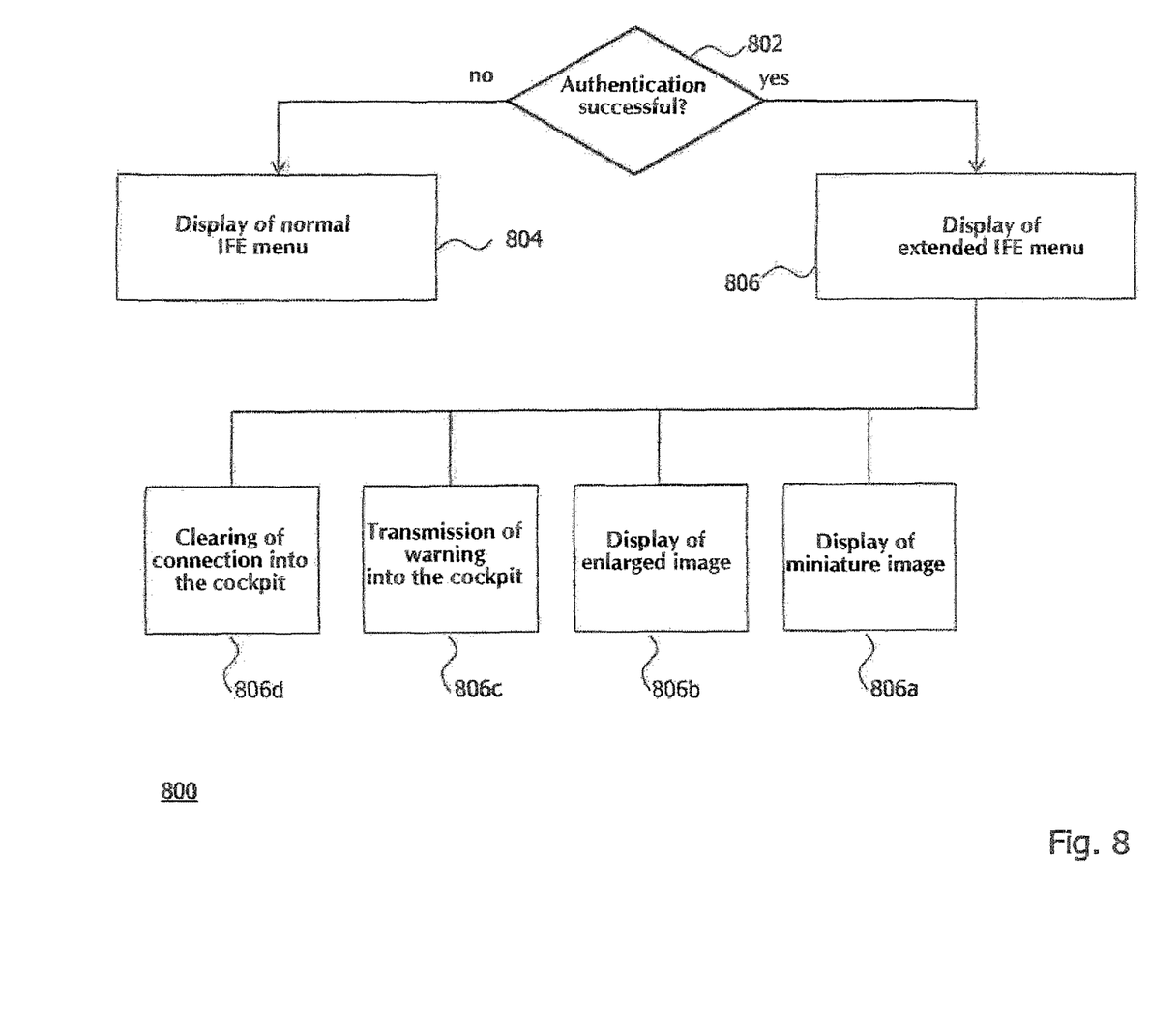
FIG. 8 a flow chart of a method executed in the surveillance device from FIG. 6 according to a second embodiment of the present invention.

FIG. 8 shows a flow chart of a method executed in the surveillance device 600 from FIG. 6 according to a second embodiment. Firstly, in step 802, whether or not a person is an access-authorised person, such as an air marshal, is examined by the authentication unit 620. For this purpose the person enters, without prompting by the system, an access-authorisation request into an authentication appliance such as is shown in exemplary manner in FIGS. 5a and 5b. The access-authorisation request recorded by the authentication appliance is communicated to the authentication appliance 620. If the authentication unit 620 ascertains in step 802 that the access authorisation is not granted, since the person desiring access is not an access-authorised person (because, for example, an incorrect code was entered and/or a false identification card was read in, and/or biometric data are not correct), the normal menu of a conventional in-flight entertainment programme (IFE) is displayed on the monitor on which the ungranted access-authorisation request was undertaken (step 804). Furthermore, it is possible that in the case of an access-authorisation request that has been repeatedly entered incorrectly a warning that an attempt is being made to access the surveillance system without authority is directed to the cockpit.

If, on the other hand, the access authorisation in step 802 is granted by the authentication unit 620, in step 806 an extended IFE menu for the access-authorised person is displayed on the monitor 300a, on the assigned authentication appliance of which the access-authorisation request was made. It is possible to grant access to the extended IFE menu on one monitor only or on several monitors. In the extended IFE menu, besides the normal entertainment programme further exclusive functionalities are provided, a few of which are listed in exemplary manner in steps 806a to 806d. In the extended IFE menu it can be selected that the video image is to be displayed as a small video image of the area 14 outside the cockpit door 6 (step 806a) or as an enlarged video image of the area 14 outside the cockpit door 6 (step 806b). Furthermore, the access-authorised person can select from the extended IFE menu that, for example, acoustic information by way of warning information is transmitted into the cockpit (step 806c). Furthermore, the access-authorised person can select from the extended IFE menu that the connection of the telephone integrated into his/her seat to the cockpit is released. The functionalities of the extended IFE menu named in steps 806a to 806d are to be understood as being purely exemplary, and yet further functionalities relevant to security are conceivable, such as the selection of which, and how many, of the video images are to be displayed on the monitor 300a.

The invention claimed is:

1. A surveillance device for access to a surveillance system for keeping a cabin of an aircraft under surveillance, the surveillance device comprising:

an authenticator configured to examine an access-authorisation request for access to the surveillance system; and
a controller configured to designate, on the basis of the access-authorisation request, a display unit from a plurality of display units provided in the aircraft, and to relay a video-image signal corresponding to a captured video image of a portion of the cabin of the aircraft to the designated display unit for the purpose of displaying the video image;
wherein the designated display unit comprises a monitor configured to display the video-image signal to a person located in a passenger seat of the aircraft; and
wherein the designated display unit is located outside of a cockpit of the aircraft.

2. The surveillance device according to claim 1, wherein the controller is further configured to instruct the designated display unit to display the video image, which in particular is variable in its size, at a predetermined position on the designated display unit such that the video image is superimposed on an in-flight entertainment programme represented on the designated display unit, which is retrievable on each of the plurality of display units.

3. The surveillance device according to claim 1, wherein the controller is further configured to instruct the designated display unit to display a warning element and, upon selection of the warning element, to cause a warning appliance to transmit a warning signal, in particular at least one of an acoustic and visual warning signal, into the cockpit of the aircraft.

4. The surveillance device according to claim 1, wherein the controller is further configured to unlock a telephone assigned to the designated display unit for connection to the cockpit of the aircraft.

5. A surveillance system for keeping a cabin of an aircraft under surveillance, the surveillance system comprising:
(a) a surveillance device for access to a surveillance system for keeping a cabin of an aircraft under surveillance, the surveillance device comprising:
an authenticator configured to examine an access-authorisation request for access to the surveillance system; and
a controller configured to designate, on the basis of the access-authorisation request, a display unit from a plurality of display units provided in the aircraft, and to relay a video-image signal corresponding to a captured video image of a portion of the cabin of the aircraft to the designated display unit for the purpose of displaying the video image;
wherein the designated display unit comprises a monitor configured to display the video-image signal to a person located in a passenger seat of the aircraft; and
wherein the designated display unit is located outside of a cockpit of the aircraft; and
(b) a camera, the camera comprising at least one video camera configured and arranged and oriented in such a manner in the aircraft to capture in each instance a video image of differing portions of the cabin of the aircraft and in each instance to generate an associated video-image signal.

6. The surveillance system according to claim 5, wherein the at least one video camera is provided on or above a cockpit door arranged between the cockpit and the cabin and is configured and is oriented in such a manner in the direction of the cabin to capture a video image of a portion of the cabin outside the cockpit door and to generate an associated video-image signal.

7. The surveillance system according to claim 5, the surveillance system further comprising a plurality of authentication appliances for recording the access-authorisation request, each of the plurality of authentication appliances being assigned to a display unit of the plurality of display units, and the controller being further configured to designate the display unit for displaying the video image, on the assigned authentication appliance of which the access-authorisation request was recorded.

8. The surveillance system according to claim 7, wherein the plurality of authentication appliances each comprise at least one of a code-inputter comprising one of a telephone or a touch-screen, for entering a predefined code, and a card-reader configured to evaluate an identification card, and a reader configured to identify electromagnetic waves emitted by a transponder.

9. The surveillance system according to claim 5, wherein at least one of: the camera is part of a cockpit-door surveillance system provided on board the aircraft and the display units are part of an in-flight entertainment system.

10. A method for access to a surveillance system for keeping a cabin of an aircraft under surveillance, the method comprising the following steps:
examining, by an authenticator, an access-authorisation request for access to the surveillance system;
designating, by a controller and on the basis of the access-authorisation request, a display unit from a plurality of display units provided in the aircraft and outside of a cockpit of the aircraft; and
relaying, by the controller, a video-image signal corresponding to a captured video image of a portion of the cabin of the aircraft to the designated display unit for the purpose of displaying the video image;
wherein the designated display unit comprises a monitor configured to display the video-image signal to a person located in a passenger seat of the aircraft.

11. The method according to claim 10, wherein further a warning element is displayed on the designated display unit and upon selection of the warning element a warning signal, particular at least one of an acoustic and visual warning signal, is transmitted into the cockpit of the aircraft.

12. The method according to claim 10, wherein further a telephone assigned to the designated display unit for connecting to the cockpit of the aircraft is released.

13. The method according to claim 10, wherein the video image, which in particular is variable in its size, is displayed in such a manner at a predetermined position on the designated display unit that the video image is superimposed on an in-flight entertainment programme represented on the designated display unit, which is retrievable on each of the plurality of display units.

14. A non-transitory computer readable storage medium comprising a computer program configured to execute the method according to claim 10.

* * * * *